US 7,891,342 B2

(12) United States Patent
Dintino et al.

(10) Patent No.: US 7,891,342 B2
(45) Date of Patent: Feb. 22, 2011

(54) METHOD AND SYSTEM FOR CONTROLLING OPERATING PRESSURE IN A COMMON-RAIL FUEL INJECTION SYSTEM, PARTICULARLY FOR A DIESEL ENGINE

(75) Inventors: Maura Dintino, Turin (IT); Roberto Vernassa, Volpiano (IT); Paolo Zamboni, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 12/470,315

(22) Filed: May 21, 2009

(65) Prior Publication Data

US 2009/0288638 A1 Nov. 26, 2009

(30) Foreign Application Priority Data

May 21, 2008 (EP) .................................. 08009373

(51) Int. Cl.
*F02M 59/36* (2006.01)
*F02B 3/00* (2006.01)

(52) U.S. Cl. ....................... 123/458; 123/300
(58) Field of Classification Search ................. 123/294, 123/299–300, 305, 458, 500
See application file for complete search history.

(56) References Cited

U.S. PATENT DOCUMENTS

| | | | | |
|---|---|---|---|---|
| 5,127,378 A | * | 7/1992 | Ito | 123/300 |
| 5,794,586 A | * | 8/1998 | Oda et al. | 123/305 |
| 5,992,373 A | * | 11/1999 | Hosoya et al. | 123/305 |
| 6,269,791 B1 | * | 8/2001 | Tanaka et al. | 123/300 |
| 6,314,935 B2 | * | 11/2001 | Tanaka et al. | 123/298 |
| 6,672,279 B2 | * | 1/2004 | Nakayama et al. | 123/299 |
| 6,889,666 B2 | * | 5/2005 | Oono | 123/514 |
| 6,899,084 B2 | * | 5/2005 | Miyashita | 123/446 |
| 6,904,890 B2 | * | 6/2005 | Maitani et al. | 123/294 |
| 6,964,262 B2 | * | 11/2005 | Hayakawa | 123/458 |

(Continued)

FOREIGN PATENT DOCUMENTS

DE 19859913 A1 7/1999

(Continued)

*Primary Examiner*—Thomas N Moulis
(74) *Attorney, Agent, or Firm*—Ingrassia Fisher & Lorenz, P.C.

(57) ABSTRACT

In a fuel injection system of an internal combustion engine that includes, but is not limited to injectors (I1-I4), each of which is adapted to deliver a predetermined amount of pressurized fuel to a combustion chamber of a respective cylinder (C1-C4) of the engine, a high-pressure accumulator volume common to the injectors (I1-I4) and arranged to maintain the fuel at high-pressure, a pressure sensor for measuring fuel pressure in the accumulator volume, a metering unit for adjusting the fuel pressure in the accumulator volume as a function of the measured pressure, so as to maintain a predetermined target injection pressure set-point dependent on the engine operating point by returning excess fuel to a fuel tank; and an electronic control unit arranged for controlling fuel injection timing and quantity by operating injectors control valves, the operating pressure is controlled by triggering retarded injections (INJpost) of a predetermined quantity of fuel to the combustion chamber of the cylinders (C1-C4) of the engine during a respective exhaust stroke, when pressure above a predetermined threshold (THover) is detected in the accumulator volume, so as to discharge fuel from the accumulator volume without it taking part to the combustion process, thereby reducing pressure in the accumulator volume.

22 Claims, 3 Drawing Sheets

U.S. PATENT DOCUMENTS

| | | | |
|---|---|---|---|
| 7,089,908 B2 * | 8/2006 | Fujieda et al. | 123/299 |
| 7,234,440 B2 * | 6/2007 | Hilditch | 123/305 |
| 7,281,517 B2 * | 10/2007 | Miyazaki et al. | 123/431 |
| 7,552,716 B2 * | 6/2009 | Osaki | 123/457 |
| 7,720,593 B2 * | 5/2010 | Yi et al. | 701/105 |
| 2004/0194762 A1 | 10/2004 | Okamoto | |

FOREIGN PATENT DOCUMENTS

| | | |
|---|---|---|
| DE | 10158547 A1 | 6/2002 |
| DE | 102005012997 A1 | 9/2006 |
| EP | 0764777 A | 3/1997 |
| EP | 0896144 A2 | 2/1999 |
| GB | 2332241 A | 6/1999 |
| WO | 2008003717 A | 1/2008 |

* cited by examiner

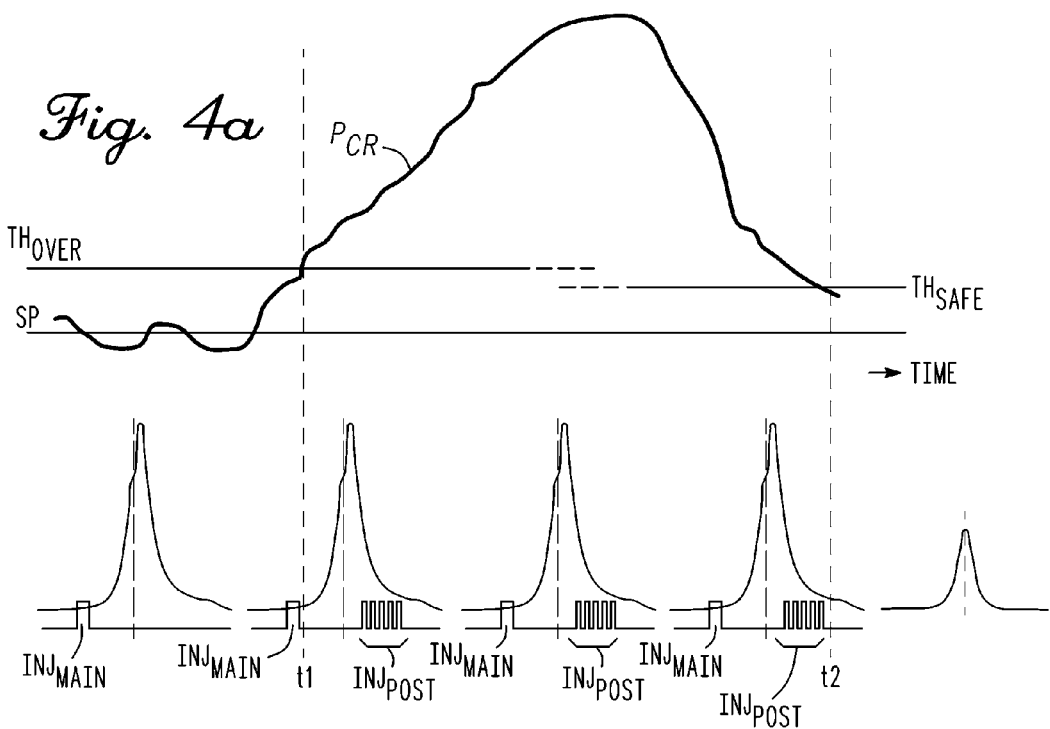
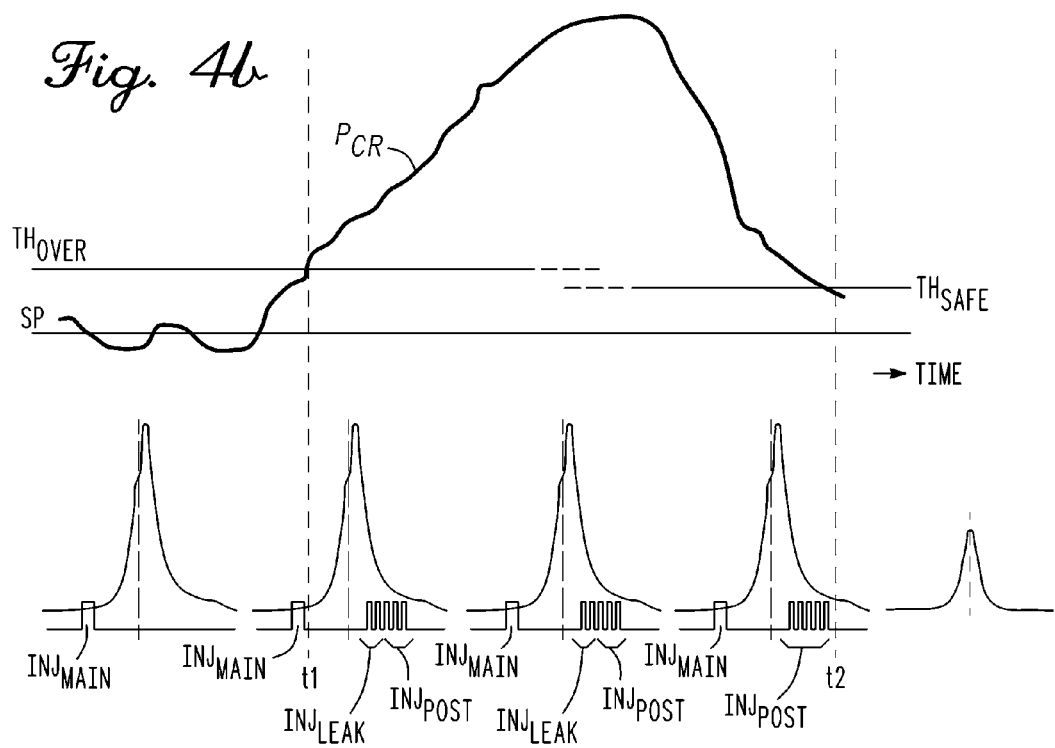

METHOD AND SYSTEM FOR CONTROLLING OPERATING PRESSURE IN A COMMON-RAIL FUEL INJECTION SYSTEM, PARTICULARLY FOR A DIESEL ENGINE

CROSS-REFERENCE TO RELATED APPLICATION

This application claims priority to European Patent Application No. 08009373.5, filed May 21, 2008, which is incorporated herein by reference in its entirety.

TECHNICAL FIELD

The present invention refers to fuel injection in internal combustion engines, and specifically to a method and system for controlling operating pressure in a common-rail fuel injection system, particularly for a diesel engine.

BACKGROUND

In a common-rail fuel injection system, the functions of pressure generation and fuel injection are separate by means of an accumulator volume (precisely, the common fuel rail) and the injection high pressure is generated and maintained independent of the engine speed and the injected fuel quantity.

Fuel under pressure is supplied to the common rail by means of a continuously operating high-pressure pump driven by the engine. The required pressure inside the rail, which is variable dependent on the engine operating point, is controlled by a metering unit of the fuel mass located at the inlet of the high-pressure pump at the low-pressure side of the injection system. The metering unit makes sure that the pump delivers the right quantity of fuel to the rail according to the current fuel pressure measured by a rail-pressure sensor in a closed loop control driven by an electronic control unit. The pressure control performance are however poorer in comparison with a control based on a valve which can act straight on the rail on the high-pressure side. Actually, a slower fuel pressure response can lead to increasing emissions and noise, as well as to undesired overpressure in case of fault of one injector.

To the purpose of overcoming the above disadvantages, a pressure-relief valve connected to a return line to a fuel tank is also traditionally fitted to the fuel rail (thus, on the high-pressure side of the fuel injection system) in order to act as a pressure control valve, particularly for draining fuel not required for injection in a control loop rapidly reacting to changes in the engine operating point (e.g., in the event of negative load changes, such as the release of the accelerator pedal by the driver), as well as to limit fuel pressure in the fuel rail to the maximum permissible pressure, in which case it acts as a pressure limiter.

In case of a fault on the metering unit (i.e., an electrical or mechanical fault that causes the valve of the unit to be blocked open) the rail pressure can reach dangerous levels for the integrity of the components of the engine and even of the vehicle, and the pressure-relief valve acts to drain the fuel in excess in the common rail to a re-circulating line conveying it back to the tank.

However, such a pressure-relief valve is an expensive component and it would be desirable to achieve a significant cost reduction in common-rail systems.

EP 0 896 144 discloses a fuel injection control apparatus for an accumulator type engine, wherein an electronic control unit is adapted to actuate the injectors during an ineffective injection control time so that they release fuel to the fuel tank through a return pipe in order to reduce the fuel pressure in the common rail.

GB 2 332 241 discloses an accumulator fuel injection systems for vehicle diesel engines wherein an electronic control unit is adapted to turn on a solenoid valve of an injector to cause the pressurized fuel supplied from the common rail to a controlled chamber of the injector to be drained to the fuel tank on a lower pressure side.

At least one aim of the present invention is to improve the engine performances without increasing the costs, and specifically to develop a strategy for effectively controlling the operating high pressure in a cost-effective common-rail fuel injection system lacking any pressure relief valve on the high-pressure side. More specifically, it is at least one object of the present invention to develop a cost-effective strategy for controlling the high pressure in a fuel injection system in order either to track a variable pressure set-point determined as a function of the engine operating point or to prevent serious damages to the system components due to the pressure raising above an admissible range of pressure set-points (e.g., because of a fault in the pressure regulating means provided on the low pressure side of the system). In addition, other aims, objects, desirable features and characteristics will become apparent from the subsequent summary and detailed description, and the appended claims, taken in conjunction with the accompanying drawings and this background.

SUMMARY

In summary, the embodiments of the invention are based on using the injectors as pressure-limiter valves by applying a control strategy actuating non-effective post injections (i.e., injections events occurring after the effective main and secondary injections determined according the normal injection pattern), when anomaly in the rail pressure is detected, in order to build a system without the pressure-relief valve on the high-pressure side.

BRIEF DESCRIPTION OF THE DRAWINGS

The present invention will hereinafter be described in conjunction with the following drawing figures, wherein like numerals denote like elements, and:

FIGS. 4a and 4b are synoptic graphs combining the representations of FIG. 2 and FIGS. 3b and 3c.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
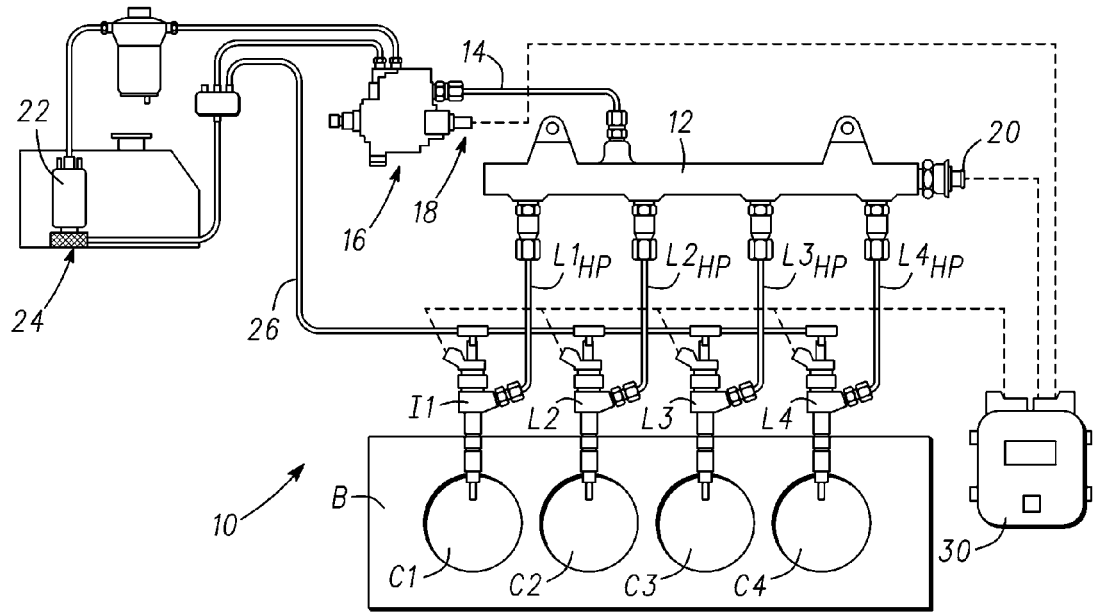
FIG. 1 shows a diagrammatic view of a fuel injection system in an internal combustion engine, according to an embodiment of the invention.

In FIG. 1 of the annexed drawings an internal combustion engine, such as a diesel engine, equipped with a common-rail fuel injection system (e.g., an engine adapted to be fitted in a motor-vehicle, is generally referred to with 10).

The engine 10 is in particular a four-stroke engine, which in the exemplary embodiment shown has four cylinders made in an engine block B. Respective electrically-controlled fuel injectors, for instance solenoid-operated injectors I1-I4, are fitted in the cylinder heads, and each of them is adapted to deliver a predetermined amount of pressurized fuel to a combustion chamber of a respective cylinder C1-C4 of the engine.

In a per se known manner the engine 10 comprises a common accumulator volume or fuel rail 12 connected by means of a high-pressure supply line 14 to a high-pressure pump 16 equipped with pressure regulating means such as a suction metering unit 18 for supplying fuel under a predetermined target high pressure to the accumulator volume. A rail pressure sensor 20 is fitted to the fuel rail 12 and adapted to detect fuel pressure inside the rail and issue a corresponding pressure signal.

The metering unit 18 is adapted to regulate the flow of fuel fed to the high-pressure pump 16 from a low-pressure pump 22 associated to a fuel tank 24 of the motor-vehicle (e.g., by returning excess fuel to the fuel tank, with a view to adjusting the fuel pressure in the accumulator volume as a function of the pressure measurement), so as to maintain a predetermined target injection pressure set-point dependent on the engine operating point.

The fuel injectors I1-I4 are connected to the common fuel rail 12 through respective short high-pressure lines L1HP-L4HP for conveying the pressurized fuel intended to be injected in the combustion chamber of the respective cylinder. The fuel injectors I1-I4 are also connected back to the fuel tank 24 through a re-circulating low-pressure line 26 for discharge of dynamic leakages which occur from the injector chamber at the time of energizing the solenoid actuating valve prior to the opening of the injector nozzle.

The fuel injectors I1-I4 as well as the metering unit 18 are suitably driven by a fuel injection electronic control unit 30 receiving information on the current fuel pressure in the accumulator volume through the rail pressure sensor 20 and storing a predetermined injection map interrelating the injection fuel quantity and pressure with the engine operating mode (the engine speed as well as other influencing parameters such as fuel and intake-air temperature) and the driver's wishes (accelerator-pedal setting).

Figure 2:
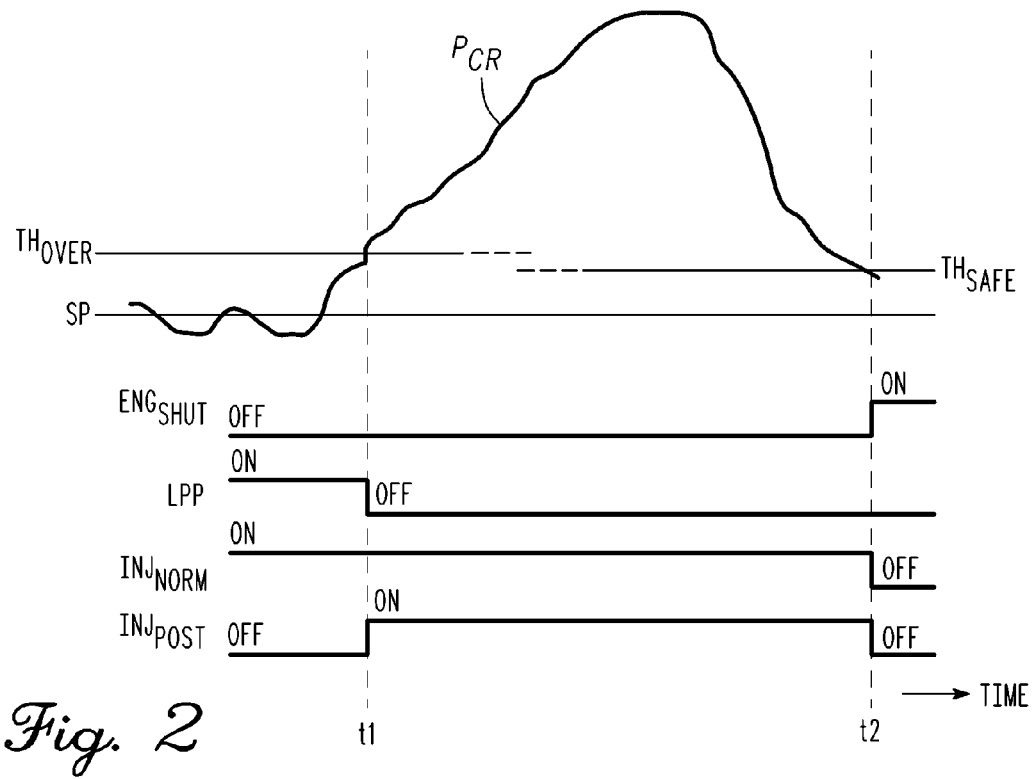
FIG. 2 is a graph depicting the operation of the method according to an embodiment of the invention.

FIG. 2 is a graph depicting the operation of the method according to an embodiment of the invention when a fault in the pressure regulating means provided on the low pressure side of the system occurs, thus causing an overpressure in the fuel rail.

A curve representative of the evolution of the rail pressure value over time is indicated with pCR.

During normal operating conditions the rail pressure is maintained by the metering unit 18 associated with the high-pressure pump 16 very close to the set-point SP, which is herein depicted with a constant value but is generally variable as a function of the engine operating point.

At instant t1 the rail pressure value exceeds an overpressure detection threshold THover (e.g., due to a fault event in the metering unit 18).

Conveniently, detection of the overpressure in the accumulator volume is preferably made when the fuel pressure measured by the sensor 20 exceeds the relative overpressure threshold THover for at least a predetermined time.

According to the method in accordance with an embodiment of the invention the low pressure feeding pump 22 is then stopped from supplying fuel to the high-pressure pump 16, and ineffective post injections (i.e., injections which do not contribute to the combustion process and thus to torque generation), are actuated by the electronic control unit 30 besides the normal injection pattern, in order to keep under control the peak pressure generated by the fault event and safeguard the components of the injection system. These actions are represented in FIG. 2 by signals LPP, INJnorm and INJpost, and the ON state indicates that the corresponding component/function is actively controlled and the OFF state indicates that the component is switched off or the function is discontinued.

Specifically, the injection timing is controlled by the electronic control unit 30 by triggering retarded injections INJpost of a predetermined quantity of fuel to the combustion chamber of the cylinders of the engine during a respective exhaust stroke so as to discharge fuel from the accumulator volume without it taking part to the combustion process.

FIGS. 3a, 3b and 4a, 4b show the pressure curve p in the combustion chamber evolving throughout the engine operating cycle and a signal INJ illustrative of the controlled injection pulses.

In a normal operating condition (FIG. 3a) the electronic control unit 30 is arranged to control an injection pattern including a main injection pulse INJmain and possibly a pre-injection pulse and secondary injection pulses (not shown) depending on the application for which the engine is intended.

In an overpressure operating condition (FIG. 3b and FIG. 3c), retarded injection pulses INJpost are added by the electronic control unit 30 to the normal injection pattern during each exhaust stroke in a cylinder. Specifically, a train of consecutive retarded injections is triggered in a range of degrees of crankshaft rotation between about 100° and about 300° after the top dead centre, each injection having a duration of about 400 microseconds and dependent on the pressure peak. A person skilled in the art would understand that the mentioned timing and duration are referred to a four-cylinder engine and different timings and durations are possible dependent on a different number of cylinders.

Triggering of the retarded injections is maintained by the electronic control unit 30 during successive operating engine cycles, as it is depicted in FIG. 4a, thereby at any time attempting to reduce the fuel pressure pCR in the accumulator volume, until the pressure is detected by sensor 20 at time t2 under a predetermined safe threshold THsafe, which is set lower than the fault overpressure threshold THover.

When the fuel pressure pCR in the accumulator volume has reached said predetermined safe threshold any injection is ceased (thus, both the normal injection pattern and the retarded discharge injections) and engine shutdown is requested to the corresponding control unit (signal ENGshut in FIG. 2).

Safe threshold THsafe is preferably chosen with a value lower than overpressure threshold THover so that residual pressure surges which may occur when fuel discharge through the injectors is terminated do not contribute to reaching the overpressure threshold anew.

Figure 3A:
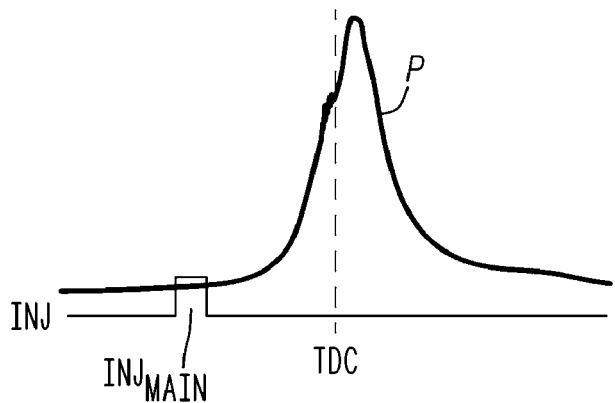
FIGS. 3a-3c are graphs of the pressure curve in the combustion chamber evolving throughout an engine operating cycle, with a superimposed signal illustrative of the controlled injection pulses, in (a) a normal operating condition, in (b) an operating condition according to the invention, and in (c) an operating condition according to an embodiment of the invention, respectively.
Figure 3B:
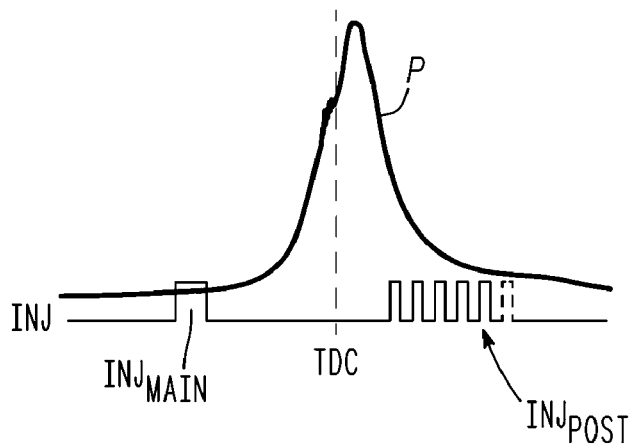
Figure 3C:
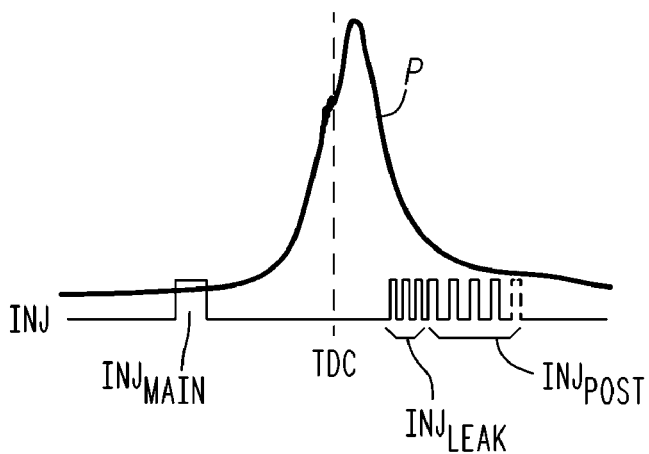

With respect to FIG. 3c (and corresponding FIG. 4b) a variant of the embodiment of the invention is described, adapted to enhance the discharge of fuel from the accumulator volume.

According to the depicted variant, between the normal injection pattern, which is herein represented as a simple main injection INJmain, but a skilled man could understand that pre-injections as well as secondary injections will fall within the scope of the example, and the train of retarded injections INJpost, the electronic control unit 30 is arranged to actuate the injectors by a train of pulses INJleak for respectively short energizing times so that their respective pilot valve is displaced to determine leakage of fuel toward the low pressure line of the system during an ineffective injection time, thus taking advantage of the behavior of the injector hydraulic mechanism. The electronic control unit 30 is adapted to control the energizing time to be shorter than a predetermined minimum energizing time required for displacing the injector nozzle needle by effect of pressure balancing within the injector chambers, thus avoiding an effective injection in the combustion chamber.

These further injectors' actuations may therefore be triggered in advance of the retarded injections and even during the combustion stroke, having confidence that they do not contribute to torque generation. Preferably, the train of pulses INJleak may also be triggered in a range of degrees of crankshaft rotation between about 100° and about 300° after the top dead centre, each injection having a duration of about 180 microseconds and dependent on the injection pressure as well as on the type of injector.

Though the invention has been exemplarily described with reference to the event of an overpressure in the fuel rail due to a fault in the pressure regulating means provided on the low pressure side of a fuel injection system, it is applicable also to controlling the high pressure in a fuel injection system in order to track a variable pressure set-point.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for controlling operating pressure in a fuel injection system of an internal combustion engine, comprising the steps of:
   supplying fuel under a predetermined target high pressure to an accumulator volume common to a plurality of electrically controlled fuel injectors (I1-I4), each of which is adapted to deliver a predetermined amount of pressurized fuel to a combustion chamber of a respective one of a plurality of cylinders (C1-C4) of the internal combustion engine;
   measuring fuel pressure in an accumulator volume; and
   adjusting the fuel pressure in the accumulator volume as a function of the fuel pressure, so as to maintain a predetermined target injection pressure set-point dependent on an internal combustion engine operating point by returning excess fuel to a fuel tank;
   controlling injection timing by triggering retarded injections (INJpost) of a predetermined quantity of fuel to the combustion chamber of the plurality of cylinders (C1-C4) of the internal combustion engine during a respective exhaust stroke, when pressure above a predetermined threshold (THover) is detected in the accumulator volume, so as to discharge fuel from the accumulator volume without it taking part to a combustion process, thereby reducing pressure in the accumulator volume.

2. A method according to claim 1, wherein said predetermined threshold (THover) is a pressure set-point (SP) determined as a function of an engine operating point.

3. A method according to claim 1, wherein said predetermined threshold (THover) is a fault overpressure threshold (THover) set above an admissible range of pressure set-points.

4. A method according to claim 3, including triggering a train of consecutive retarded injections (INJpost) during one exhaust stroke in a cylinder (C1-C4).

5. A method according to claim 4, wherein said train of consecutive retarded injections (INJpost) is triggered in a range of degrees of crankshaft rotation between about 100° and about 300° after a substantially top dead center.

6. A method according to claim 4, including maintaining a injection pattern (INJmain) during an operating cycle comprising retarded injections (INJpost).

7. A method according to claim 4, including stopping supplying fuel from the fuel tank to the accumulator volume during an operating cycle comprising retarded injections (INJpost).

8. A method according to claim 3, wherein triggering of retarded injections (INJpost) is maintained during successive operating engine cycles until fuel pressure in the accumulator volume is detected under a predetermined safe threshold (THsafe) lower than a fault overpressure threshold (THover).

9. A method according to claim 8, further comprising the steps of:
   ceasing injections (INJmain, INJpost); and
   requesting engine shutdown when the fuel pressure in the accumulator volume has reached said predetermined safe threshold (THsafe).

10. A method according to claim 3, further comprising the step of detecting an overpressure in the accumulator volume when the fuel pressure exceeds a fault overpressure threshold (THover) for at least a predetermined time.

11. A method according to claim 1, further comprising the step of actuating the plurality of electrically controlled fuel injectors (I1-I4) for a short energizing time (INJleak) so that an injector control valve is displaced to determine leaking of fuel toward a low pressure line during an ineffective injection time, an energizing time (INJleak) being shorter than a predetermined minimum energizing time required for displacing an injector nozzle needle, thus avoiding an effective injection in the combustion chamber.

12. A system for controlling operating pressure in a fuel injection system of an internal combustion engine, including:
   a plurality of injectors (I1-I4), each of which is adapted to deliver a predetermined amount of pressurized fuel to a combustion chamber of a respective one of a plurality of cylinders (C1-C4) of the internal combustion engine;
   a high-pressure accumulator volume common to said plurality of injectors (I1-I4) and arranged to maintain the fuel at high-pressure;
   a sensor for measuring fuel pressure in an accumulator volume;
   an adjustor for adjusting the fuel pressure in the accumulator volume as a function of the fuel pressure, so as to maintain a predetermined target injection pressure set-point dependent on an engine operating point by returning excess fuel to a fuel tank; and
   an electronic controller arranged for controlling a fuel injection timing and quantity by operating injectors control valves, the electronic controller is arranged to control an injection timing by triggering retarded injections (INJpost) of a predetermined quantity of fuel to the combustion chamber of the plurality of cylinders (C1-

C4) of the internal combustion engine during a respective exhaust stroke, when pressure above a predetermined threshold (THover) is detected in the accumulator volume, so as to discharge fuel from the accumulator volume without it taking part to a combustion process, thereby reducing pressure in the accumulator volume, said electronic controller being further arranged to:

supply fuel under a predetermined target high pressure to an accumulator volume common to a plurality of electrically controlled fuel injectors (I1-I4), each of which is adapted to deliver the predetermined amount of pressurized fuel to the combustion chamber of a respective cylinder (C1-C4) of the internal combustion engine;

measure fuel pressure in the accumulator volume; and adjust the fuel pressure in the accumulator volume as a function of the fuel pressure, so as to maintain the predetermined target injection pressure set-point dependent on the engine operating point by returning excess fuel to the fuel tank;

control injection timing by triggering retarded injections (INJpost) of the predetermined quantity of fuel to the combustion chamber of the plurality of cylinders (C1-C4) of the internal combustion engine during the respective exhaust stroke, when pressure above the predetermined threshold (THover) is detected in the accumulator volume, so as to discharge fuel from the accumulator volume without it taking part to the combustion process, thereby reducing pressure in the accumulator volume.

13. A system according to claim 12, wherein said predetermined threshold (THover) is a pressure set-point (SP) determined as a function of the engine operating point.

14. A system according to claim 12, wherein said predetermined threshold (THover) is a fault overpressure threshold (THover) set above an admissible range of pressure set-points.

15. A system according to claim 14, said electronic controller further arranged to trigger a train of consecutive retarded injections (INJpost) during one exhaust stroke in a cylinder (C1-C4).

16. A system according to claim 15, wherein said train of consecutive retarded injections (INJpost) is triggered in a range of degrees of crankshaft rotation between about 100° and about 300° after a substantially top dead center.

17. A system according to claim 15, said electronic controller is further arranged to maintain a injection pattern (INJmain) during an operating cycle comprising retarded injections (INJpost).

18. A system according to claim 15, said electronic controller is further arranged to stop supplying fuel from the fuel tank to the accumulator volume during an operating cycle comprising retarded injections (INJpost).

19. A system according to claim 14, wherein triggering of retarded injections (INJpost) is maintained during successive operating engine cycles until fuel pressure in the accumulator volume is detected under a predetermined safe threshold (THsafe) lower than a fault overpressure threshold (THover).

20. A system according to claim 19, wherein said electronic controller is further arranged to:

cease injections (INJmain, INJpost); and request engine shutdown when the fuel pressure in the accumulator volume has reached said predetermined safe threshold (THsafe).

21. A system according to claim 14, wherein said electronic controller is further arranged to detect an overpressure in the accumulator volume when the fuel pressure exceeds a fault overpressure threshold (THover) for at least a predetermined time.

22. A system according to claim 12, wherein said electronic controller is further arranged to actuate the plurality of electrically controlled fuel injectors (I1-I4) for a short energizing time (INJleak) so that an injector control valve is displaced to determine leaking of fuel toward a low pressure line of the system during an ineffective injection time, an energizing time (INJleak) being shorter than a predetermined minimum energizing time required for displacing an injector nozzle needle, thus avoiding an effective injection in the combustion chamber.

* * * * *